(12) United States Patent
Hansen

(10) Patent No.: US 11,875,942 B2
(45) Date of Patent: Jan. 16, 2024

(54) ENCAPSULATED SUPERCAPACITOR MODULE HAVING A HIGH VOLTAGE AND LOW EQUIVALENT SERIES RESISTANCE

(71) Applicant: AVX Corporation, Fountain Inn, SC (US)

(72) Inventor: Shawn Hansen, Simpsonville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 16/275,520

(22) Filed: Feb. 14, 2019

(65) Prior Publication Data

US 2019/0259549 A1 Aug. 22, 2019

Related U.S. Application Data

(60) Provisional application No. 62/633,796, filed on Feb. 22, 2018.

(51) Int. Cl.

| | | |
|---|---|---|
| *H01G 11/80* | (2013.01) | |
| *H01G 11/32* | (2013.01) | |
| *H01G 11/10* | (2013.01) | |
| *H01G 11/52* | (2013.01) | |
| *H01G 11/74* | (2013.01) | |
| *G01F 15/00* | (2006.01) | |
| *H02J 7/00* | (2006.01) | |

(Continued)

(52) U.S. Cl.
CPC ............ *H01G 11/80* (2013.01); *H01G 11/10* (2013.01); *H01G 11/32* (2013.01); *G01F 15/00* (2013.01); *H01G 11/52* (2013.01); *H01G 11/66* (2013.01); *H01G 11/74* (2013.01); *H02J 7/0014* (2013.01); *H02J 7/345* (2013.01)

(58) Field of Classification Search
CPC ........ H01G 11/10; H01G 11/12; H01G 11/78; H01G 4/38
See application file for complete search history.

(56) References Cited

U.S. PATENT DOCUMENTS

| | | | | |
|---|---|---|---|---|
| 1,945,108 A | * | 1/1934 | Dubilier ................... | H01G 4/38 361/329 |
| 3,475,659 A | * | 10/1969 | Cannon, Jr. .............. | H01G 9/08 361/328 |

(Continued)

FOREIGN PATENT DOCUMENTS

| | | |
|---|---|---|
| CN | 102969170 | 3/2013 |
| CN | 104183391 | 12/2014 |

(Continued)

OTHER PUBLICATIONS

Translation of CN205428709U (Year: 2016).*

(Continued)

*Primary Examiner* — Eric W Thomas

(74) *Attorney, Agent, or Firm* — Dority & Manning, P.A.

(57) ABSTRACT

A supercapacitor module is provided. In some embodiments, the supercapacitor can include a first supercapacitor, a second supercapacitor, and an interconnect electrically connecting the first and second supercapacitors in series. A casing can encapsulate at least the first and second supercapacitors. The operating voltage of the supercapacitor module can be greater than 3.5 volts, and the equivalent series resistance of the supercapacitor module can be less than about 10 ohm.

19 Claims, 6 Drawing Sheets

(51) Int. Cl.
*H02J 7/34* (2006.01)
*H01G 11/66* (2013.01)

(56) References Cited

U.S. PATENT DOCUMENTS

| | | |
|---|---|---|
| 4,763,227 A | 8/1988 | Novacek |
| 5,093,762 A | 3/1992 | Sato et al. |
| 6,413,283 B1 | 7/2002 | Day et al. |
| 7,342,768 B2 | 3/2008 | Doljack et al. |
| 7,483,259 B2 | 1/2009 | Biler |
| 7,580,245 B2 | 8/2009 | Inoue et al. |
| 7,813,105 B2 | 10/2010 | Cheung |
| 7,859,844 B2 | 12/2010 | Nguyen et al. |
| 8,116,044 B2 | 2/2012 | Pelc et al. |
| 8,194,393 B2 | 6/2012 | Inoue et al. |
| 8,358,109 B2 | 1/2013 | Gunderson |
| 8,723,506 B2 | 5/2014 | Ramirez |
| 8,829,350 B2 | 9/2014 | Iwasaki et al. |
| 8,932,750 B2 | 1/2015 | Cooley et al. |
| 9,728,342 B2 | 8/2017 | Bendale et al. |
| 10,312,028 B2 | 6/2019 | Rawal et al. |
| 2006/0103368 A1* | 5/2006 | Rowe .................. G01R 22/10 324/107 |
| 2007/0253146 A1 | 11/2007 | Inoue et al. |
| 2010/0053927 A1 | 3/2010 | Inoue et al. |
| 2010/0134940 A1 | 6/2010 | Nguyen et al. |
| 2012/0308831 A1* | 12/2012 | Mizuike ................ C08L 63/00 428/413 |
| 2013/0021021 A1 | 1/2013 | Ramirez et al. |
| 2017/0338055 A1 | 11/2017 | Knopsnyder et al. |
| 2017/0365421 A1* | 12/2017 | Horikawa ............. H01G 11/74 |
| 2019/0259548 A1 | 8/2019 | Hansen |
| 2019/0259550 A1 | 8/2019 | Hansen |
| 2019/0304711 A1 | 10/2019 | Hansen |

FOREIGN PATENT DOCUMENTS

| | | | |
|---|---|---|---|
| CN | 204230059 U | | 3/2015 |
| CN | 105551823 | | 5/2016 |
| CN | 205428709 | | 8/2016 |
| CN | 205428709 U | * | 8/2016 |
| JP | H 01230218 A | | 9/1989 |
| JP | H 06176972 A | | 6/1994 |
| JP | H 09129473 A | | 5/1997 |
| JP | 2014003193 A | | 1/2014 |
| KR | 101521802 B | | 5/2015 |
| KR | 20160123472 | | 10/2016 |
| KR | 20170024964 A | * | 3/2017 |
| KR | 20170120491 A | * | 10/2017 |

OTHER PUBLICATIONS

Maxwell Product Sheet, Jan. 27, 2018 (Year: 2018).*
Murata, Ultra-Thin Supercapacitor DMH series DMHA14R5V353M4ATA0 product sheet, created 2017.*
Information from VINATech—Scaled Supercapacitors are Suitable for Intrinsically Safe Applications, Aug. 16, 2015, 2 pages.
Product Information from VINATech regarding Hy-Cap 2-Series Module, 2015, 2 pages.
Information from VINATech—High Density Moulded Supercapacitor Module Targets Intrinsically Safe Applications, Aug. 19, 2015, 1 page.
Product Information—New 7.5V SCM Series Supercapacitor Modules from AVX Corporation, 100317, 8 pages.
Product Information—SCC LE Series SuperCapacitors from AVX Corporation, 101217, 8 pages.
Product Information—BestCap® Ultra-low ESR High Power Pulse Supercapacitors, 27 pages.
International Search Report and Written Opinion for PCT/US2019/018025 dated May 31, 2019, 12 pages.
European Search Report for EP19758025 dated Oct. 12, 2021, 8 pages.

* cited by examiner

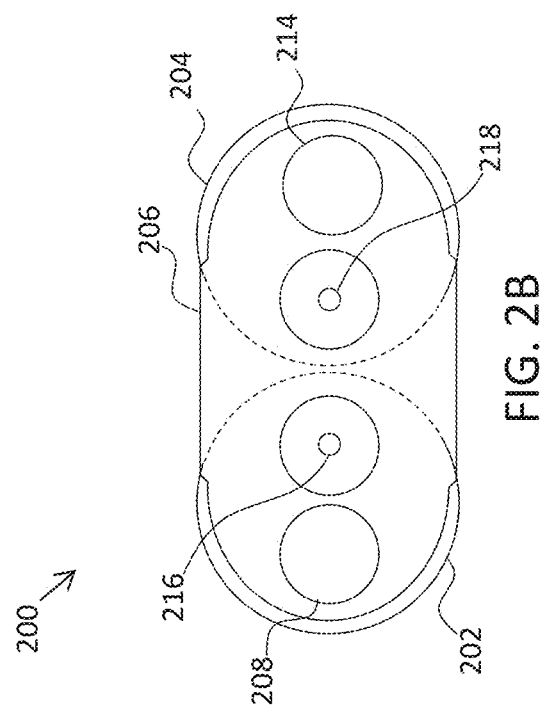
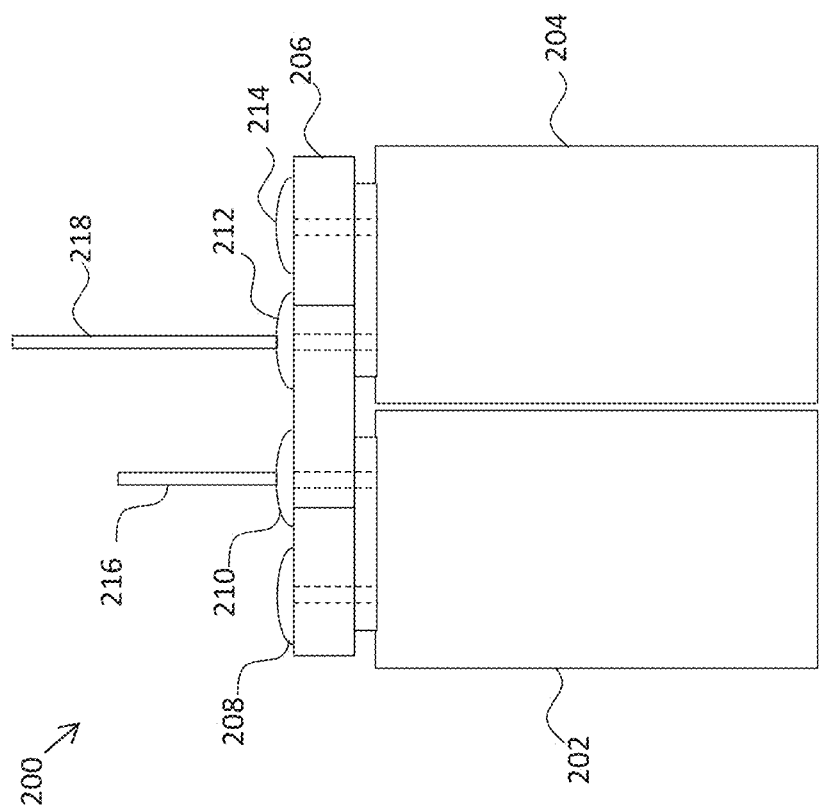

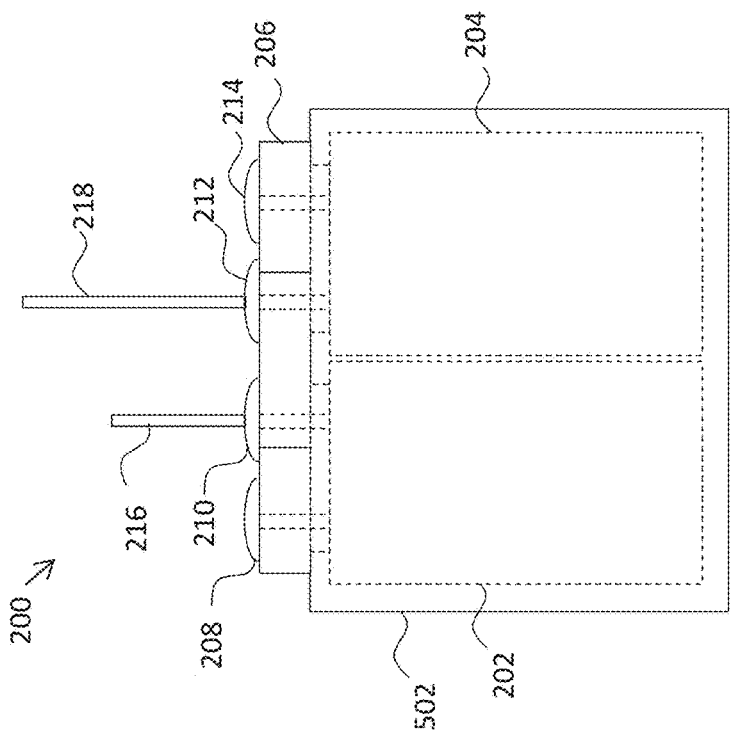
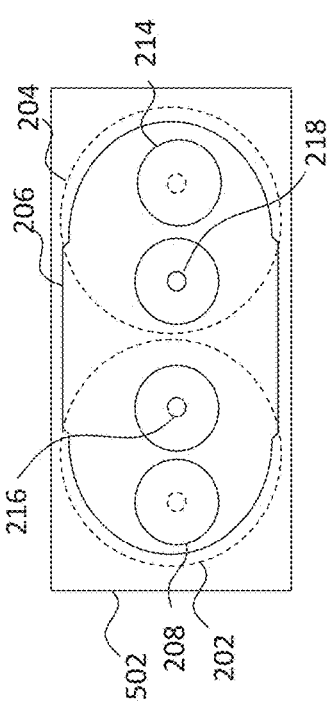
FIG. 5A
FIG. 5B
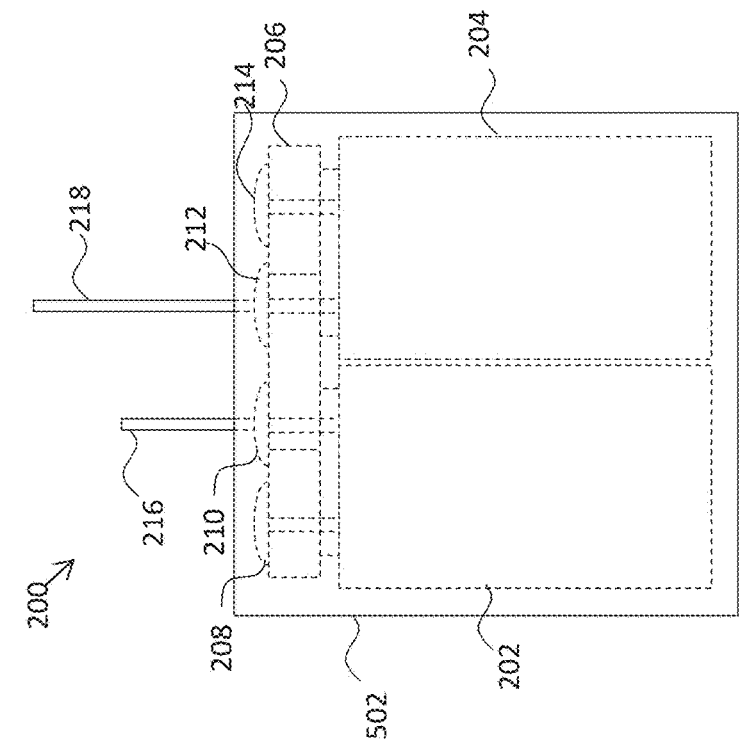
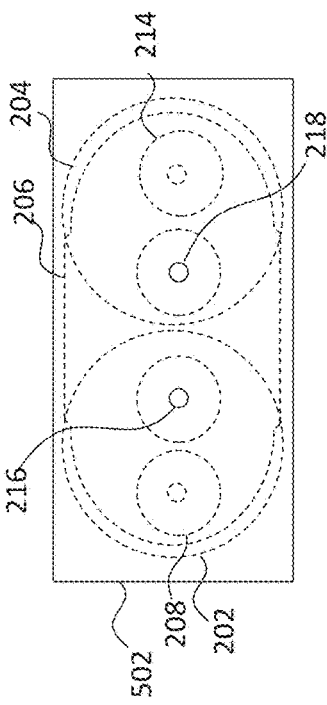
FIG. 6A
FIG. 6B

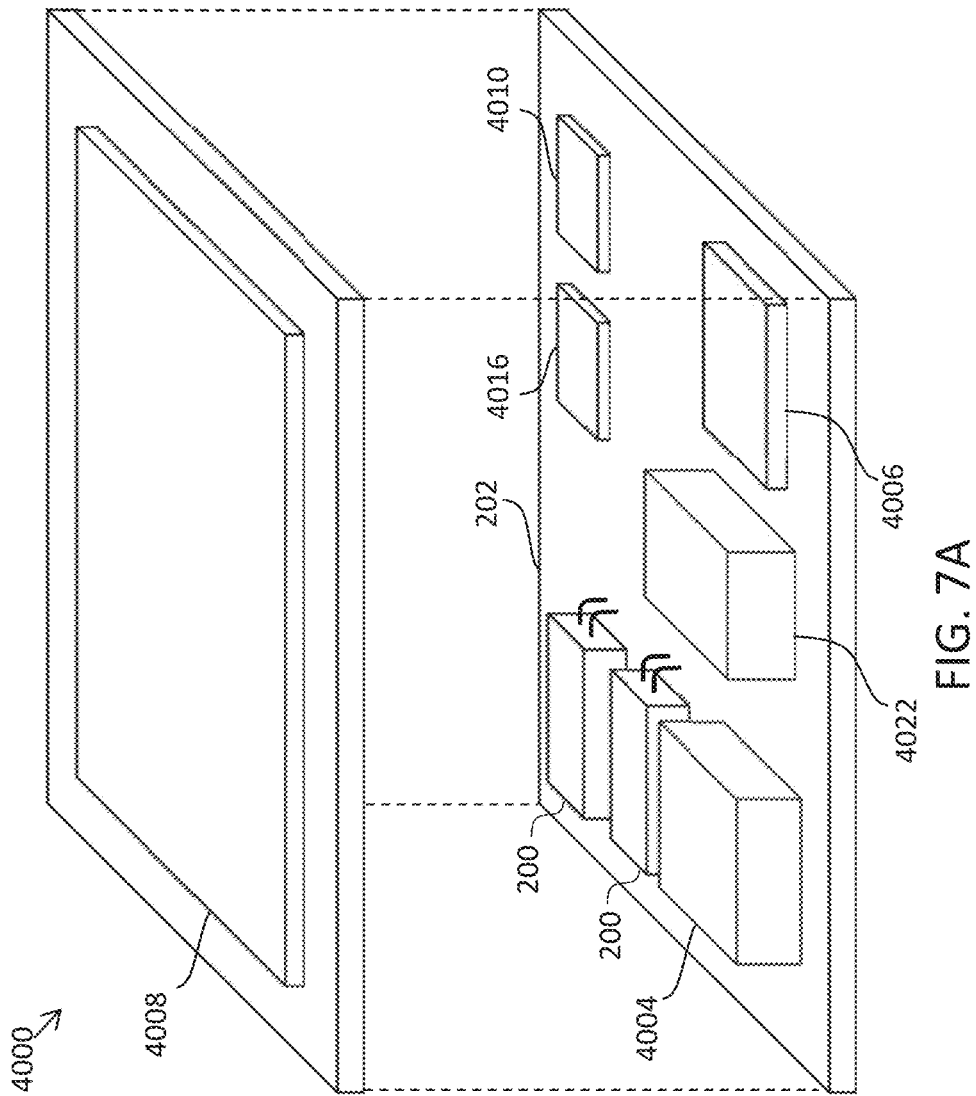

ENCAPSULATED SUPERCAPACITOR MODULE HAVING A HIGH VOLTAGE AND LOW EQUIVALENT SERIES RESISTANCE

CROSS REFERENCE TO RELATED APPLICATION

The present application claims filing benefit of U.S. Provisional Patent Application Ser. No. 62/633,796 having a filing date of Feb. 22, 2018, which is incorporated herein by reference in its entirety.

BACKGROUND OF THE INVENTION

Electrical energy storage cells are widely used to provide power to electronic, electromechanical, electrochemical, and other useful devices. A double layer supercapacitor, for instance, can employ a pair of polarizable electrodes that contain carbon particles (e.g., activated carbon) impregnated with a liquid electrolyte. Due to the effective surface area of the particles and the small spacing between the electrodes, large capacitance values can be achieved.

Electrical circuits may be formed on substrates, such as printed circuit boards (PCBs) by surface mounting various components to the substrate. Supercapacitors may be surface mounted to provide significant energy storage in a small form factor.

Heat and humidity, however, may accumulate in confined spaces between surface-mounted supercapacitors and PCBs that can cause corrosion or other damage. For example, supercapacitors can be connected to PCBs using electrical leads. Such leads may generate heat and even cause an electrolysis reaction in confined spaces between the supercapacitors and PCBs. As a result, hydrogen gas, oxygen gas, and water vapor can infiltrate and damage the supercapacitor.

Additionally, supercapacitors generally exhibit low voltages (e.g., less than 4 volts). While connecting supercapacitors in series to form a supercapacitor module provides higher voltages, the resulting module generally has undesirably has an increased equivalent series resistance (ESR). Accordingly, a supercapacitor module that exhibits a high voltage, low ESR, and successfully operates in high humidity environments would be welcomed in the art.

SUMMARY

In accordance with one embodiment, a supercapacitor module includes a first supercapacitor, a second supercapacitor, and an interconnect electrically connecting the first and second supercapacitors in series. A casing encapsulates at least the first and second supercapacitors. The operating voltage of the supercapacitor module is greater than 3.5 volts, and the equivalent series resistance of the supercapacitor module is less than about 10 ohm.

In accordance with another embodiment, a meter for measuring a flow of a product includes a supercapacitor module. The supercapacitor module includes a first supercapacitor, a second supercapacitor, and an interconnect electrically connecting the first and second supercapacitors in series. The operating voltage of the supercapacitor module is greater than 3.5 volts, and the equivalent series resistance of the supercapacitor module is less than about 10 ohm. A casing encapsulates at least the first and second supercapacitors.

In accordance with another embodiment, a supercapacitor module includes a first supercapacitor, a second supercapacitor, and an interconnect electrically connecting the first and second supercapacitors in series. The interconnect includes a balancing circuit. A casing encapsulates at least the first and second supercapacitors.

Other features and aspects of the present disclosure are set forth in greater detail below.

BRIEF DESCRIPTION OF THE DRAWINGS

A full and enabling disclosure of the present disclosure, including the best mode thereof, directed to one of ordinary skill in the art, is set forth more particularly in the remainder of the specification, which makes reference to the appended figure in which:

FIGS. 2A and 2B illustrate, respectively, a side elevation view and top view of one embodiment of a supercapacitor module in accordance with aspects of the present disclosure;

FIGS. 5A and 5B illustrate, respectively, a side elevation view and top view of one embodiment of a supercapacitor module partially encapsulated in a casing in accordance with aspects of the present disclosure;

FIGS. 6A and 6B illustrate, respectively, a side elevation view and top view of one embodiment of a supercapacitor module fully encapsulated in a casing in accordance with aspects of the present disclosure;

FIG. 7A illustrates a perspective view of an embodiment of a meter for measuring power usage that includes a supercapacitor module in accordance with aspects of the present disclosure.

Figure 1C:
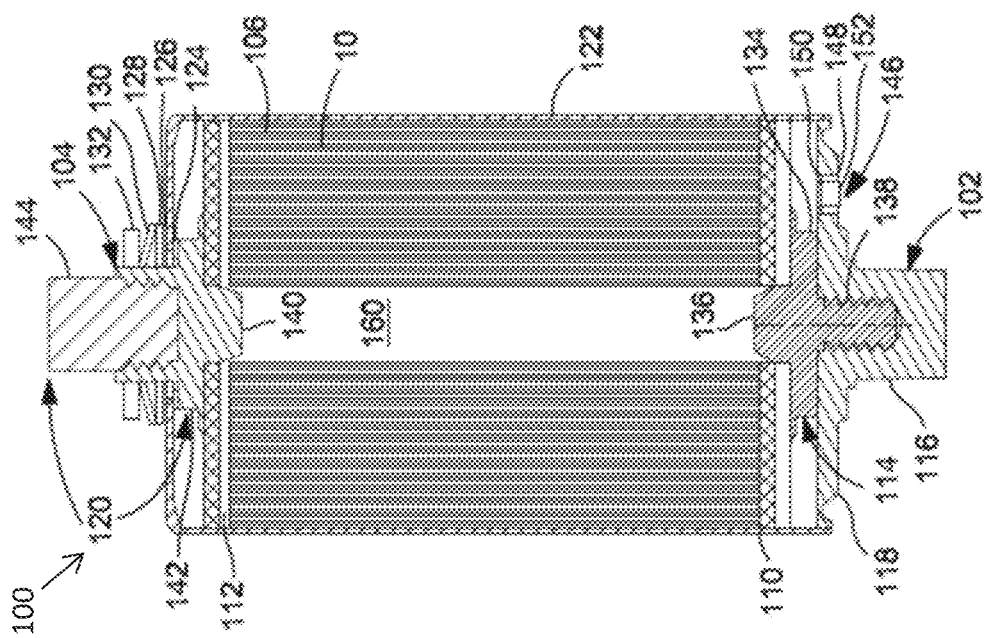
FIG. 1C illustrates a schematic view of one embodiment of a supercapacitor in accordance with aspects of the present disclosure.

Repeat use of reference characters in the present specification and drawing is intended to represent same or analogous features or elements of the disclosure.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present disclosure, which broader aspects are embodied in the exemplary construction.

Generally speaking, the present disclosure is directed to a supercapacitor module and a meter including a supercapacitor module. The supercapacitor module includes a first supercapacitor, a second supercapacitor, and an interconnect electrically connecting the first and second supercapacitors in series. The interconnect includes a positive terminal and a negative terminal. A casing encapsulates at least the first and second supercapacitors. The operating voltage of the supercapacitor module across the positive and negative terminals is greater than 3.5 volts, and the equivalent series resistance of the supercapacitor module across the positive and negative terminals is less than about 10 ohm.

The casing may improve the durability and performance of the module in humid environments by protecting the supercapacitors from moisture (e.g., humidity) that may cause corrosion and/or from impact, abrasion, etc. The casing may be formed from a variety of suitable materials. For example, in some embodiments the casing may include a thermoplastic or thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable for use in the encapsulant layer. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc.

If desired, curing agents may also be employed in the encapsulant layer to help promote curing. When employed, the curing agents typically constitute from about 0.1 to about 20 wt. % of the encapsulant layer. Exemplary curing agents include, for instance, amines, peroxides, anhydrides, phenol compounds, silanes, acid anhydride compounds and combinations thereof. Specific examples of suitable curing agents are dicyandiamide, 1-(2 cyanoethyl) 2-ethyl-4-methylimidazole, 1-benzyl 2-methylimidazole, ethyl cyano propyl imidazole, 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, etc. Still other useful curing agents include phosphine compounds, such as tributylphosphine, triphenylphosphine, tris(dimethoxyphenyl)phosphine, tris(hydroxypropyl)phosphine, and tris(cyanoethyl)phosphine; phosphonium salts, such as tetraphenylphosphonium-tetraphenylborate, methyltributylphosphonium-tetraphenylborate, and methyltricyanoethylphosphonium tetraphenylborate); amines, such as 2,4,6-tris(dimethylaminomethyl) phenol, benzylmethylamine, tetramethylbutylguanidine, N-methylpiperazine, and 2-dimethylamino-1-pyrroline; ammonium salts, such as triethylammonium tetraphenylborate; diazabicyclo compounds, such as 1,5-diazabicyclo[5, 4,0]-7-undecene, 1,5-diazabicyclo[4,3,0]-5-nonene, and 1,4-diazabicyclo[2,2,2]-octane; salts of diazabicyclo compounds such as tetraphenylborate, phenol salt, phenolnovolac salt, and 2-ethylhexanoic acid salt; and so forth.

Still other additives may also be employed, such as photoinitiators, viscosity modifiers, suspension aiding agents, pigments, stress reducing agents, non-conductive fillers, stabilizers, etc. Suitable photoinitiators may include, for instance, benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone, 2-cholorothioxanthone, etc. Likewise, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof. In certain embodiments, fillers that contain a silicon atom, such as silica and/or silicates, may be particularly suitable to enhance the ability of the barrier layer to bond to the encapsulant layer, such as through a silicon-oxygen bond. When employed, such fillers may, for instance, constitute from about 20 wt. % to about 95 wt. %, and in some embodiments, from about 50 wt. % to about 85 wt. % of the encapsulant layer.

Regardless of the particular configuration employed, the present inventors have discovered that through selective control over the particular components of the supercapacitors (e.g., electrodes, ionic liquid, etc.), the casing, and the manner/conditions in which the supercapacitors and casing are formed, it has been discovered that the resulting module can exhibit the combination of high voltage (e.g., greater than about 3.5 volts) at very low equivalent series resistance levels (e.g., less than about 10 ohm) in a robust and moisture-resistant casing that protects and improves the durability of the supercapacitors in humid environments.

In some embodiments, the module can exhibit voltages greater than about 3.5 volts, in some embodiments, greater than about 5 volts, and in some embodiments greater than about 7.5 volts. For instance, in some embodiments, the module can exhibit voltages ranges from about 1 volt to 10 volts, in some embodiments, from about 3.5 volts to about 8 volts, e.g., about 7.5 volts.

In some embodiments, the supercapacitor may have a capacitance ranging from about 1 F to about 1,500 F, in some embodiments from about 100 F to about 1,000 F.

In some embodiments, at least one of the supercapacitors of the module may include a first electrode that contains a first carbonaceous coating (e.g., activated carbon particles) electrically coupled to a first current collector, and a second electrode that contains a second carbonaceous coating (e.g., activated carbon particles) electrically coupled to a second current collector. A separator may be also positioned between the first electrode and the second electrode. The electrode assembly may be formed by combining the electrodes and separator together, such as by stacking, spirally winding, etc.

In some embodiments, at least one of the current collectors (first and/or second current collectors) projects beyond a longitudinal edge of the electrode assembly. The projecting portion of a current collector can provide an increased surface area for contacting a terminal within the housing, which can reduce ESR. As indicated above, a module can be formed including a first and second supercapacitor. In some embodiments, the module can exhibit an equivalent series resistance of less than about 5,000 milliohm determined at a temperature of 23° C., frequency of 100 kHz, and without an applied voltage. For example, in some embodiments, the module can exhibit an equivalent series resistance ranging from about 50 milliohm to about 1,500 milliohm, in some embodiments, from about 70 milliohm to about 1,000 milliohm, and in some embodiments from about 150 milliohm to about 600 milliohm.

The ESR can also remain stable at a variety of different temperatures. For example, the supercapacitor module may be placed into contact with an atmosphere having a temperature of from about 80° C. or more, in some embodiments from about 100° C. to about 150° C., and in some embodiments, from about 105° C. to about 130° C. (e.g., 85° C. or 105° C.). Even at such high temperatures, the ESR can generally remain within the ranges noted above for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours). In one embodiment, for example, the ratio of the ESR of the supercapacitor module after being exposed to the hot atmosphere (e.g., 85° C. or 105° C.) for 1008 hours to the ESR of the supercapacitor module when initially exposed to the hot atmosphere may be about 1.3 or less, in some embodiments about 1.2 or less, and in some embodiments, from about 0.2 to about 1.

Such low ESR values can also be maintained under various extreme conditions, such as when applied with a high voltage and/or in a humid atmosphere as described above. For example, the ratio of the ESR of the supercapacitor module after being exposed to the hot atmosphere (e.g., 85° C. or 105° C.) and an applied voltage to the initial ESR of the supercapacitor module when exposed to the hot atmosphere but prior to being applied with the voltage may be about 1.8 or less, in some embodiments about 1.7 or less, and in some embodiments, from about 0.2 to about 1.6. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more.

The supercapacitor module may also maintain the ESR values noted above when exposed to high humidity levels. For example, the ratio of the ESR of the supercapacitor module after being exposed to the hot atmosphere (e.g., 85° C. or 105° C.) and high humidity (e.g., 85%) to the initial capacitance value of the supercapacitor module when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more. In some embodiments, the module may be encapsulated in a casing, as discussed above, that may further improve the module's performance in high humidity environments by insulating the capacitors from the humidity.

In some embodiments, selectively controlling the electrode offset ratio and relative lengths of the projection portion and electrode assembly may result in the supercapacitor module exhibiting a reduced ESR and/or high capacitance value. The offset ratio of a projecting current collector, which is determined by dividing the length of a projecting portion of the current collector by the length of the electrode assembly, may be generally controlled to be within a range of from about 0.02 to about 0.3, in some embodiments from about 0.04 to about 0.2, and in some embodiments, from about 0.05 to about 0.1. For example, the length of the projecting portion of a current collector may be from about 1 to about 20 millimeters, in some embodiments from about 2 to about 16 millimeters, and in some embodiments, from about 5 to about 15 millimeters. Likewise, the length of the electrode assembly may be from about 5 to about 100 millimeters, in some embodiments from about 8 to about 60 millimeters, and in some embodiments, from about 10 to about 25 millimeters.

Notably, the supercapacitor may also exhibit excellent electrical properties even when exposed to high temperatures. For example, the supercapacitor may be placed into contact with an atmosphere having a temperature of from about 80° C. or more, in some embodiments from about 100° C. to about 150° C., and in some embodiments, from about 105° C. to about 130° C. (e.g., 85° C. or 105° C.). The capacitance and ESR values can remain stable at such temperatures for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours).

In one embodiment, for example, the ratio of the capacitance value of the supercapacitor after being exposed to the hot atmosphere (e.g., 85° C. or 105° C.) for 1008 hours to the capacitance value of the supercapacitor when initially exposed to the hot atmosphere may be about 0.75 or more, in some embodiments from about 0.8 to 1.0, and in some embodiments, from about 0.85 to 1.0. Such high capacitance values can also be maintained under various extreme conditions, such as when applied with a voltage and/or in a humid atmosphere. For example, the ratio of the capacitance value of the supercapacitor after being exposed to the hot atmosphere (e.g., 85° C. or 105° C.) and an applied voltage to the initial capacitance value of the supercapacitor when exposed to the hot atmosphere but prior to being applied with the voltage may be about 0.60 or more, in some embodiments from about 0.65 to 1.0, and in some embodiments, from about 0.7 to 1.0. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The supercapacitor may also maintain the capacitance values noted above when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). For example, the ratio of the capacitance value of the supercapacitor after being exposed to the hot atmosphere (e.g., 85° C. or 105° C.) and high humidity (e.g., 85%) to the initial capacitance value of the supercapacitor when exposed to the hot atmosphere but prior to being exposed to the high humidity may be about 0.7 or more, in some embodiments from about 0.75 to 1.0, and in some embodiments, from about 0.80 to 1.0. In one embodiment, for example, this ratio may be maintained for 1008 hours or more.

The ESR can also remain stable at such temperatures for a substantial period of time, such as noted above. In one embodiment, for example, the ratio of the ESR of the supercapacitor after being exposed to the hot atmosphere (e.g., 85° C. or 105° C.) for 1008 hours to the ESR of the supercapacitor when initially exposed to the hot atmosphere may be about 1.5 or less, in some embodiments about 1.2 or less, and in some embodiments, from about 0.2 to about 1. Notably, such low ESR values can also be maintained under various extreme conditions, such as when applied with a high voltage and/or in a humid atmosphere as described above. For example, the ratio of the ESR of the supercapacitor after being exposed to the hot atmosphere (e.g., 85° C. or 105° C.) and an applied voltage to the initial ESR of the supercapacitor when exposed to the hot atmosphere but prior to being applied with the voltage may be about 1.8 or less, in some embodiments about 1.7 or less, and in some embodiments, from about 0.2 to about 1.6. In one embodiment, for example, the ratio noted above may be maintained for 1008 hours or more. The supercapacitor may also maintain the ESR values noted above when exposed to high humidity levels. For example, the ratio of the ESR of the supercapacitor after being exposed to the hot atmosphere (e.g., 85° C. or 105° C.) and high humidity (e.g., 85%) to the initial capacitance value of the supercapacitor when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more.

Supercapacitor Configuration

Electrodes

As indicated above, the electrode assembly may contain first and second electrodes, which in turn may contain first and second current collectors, respectively. It should be understood that additional current collectors may also be employed if desired, particularly if the supercapacitor includes multiple energy storage cells. The current collectors may be formed from the same or different materials. Regardless, each collector may be typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

First and second carbonaceous coatings may also be electrically coupled to the first and second current collectors, respectively. While they may be formed from the same or different types of materials and may contain one or multiple layers, each of the carbonaceous coatings may generally contain at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 $cm^3/g$ to about 1.5 $cm^3/g$, and in some embodiments, from about 0.4 $cm^3/g$ to about 1.0 $cm^3/g$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

If desired, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

Other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promoters may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating may be applied to a current collector may vary as is well known to those skilled in the art, such as printing (e.g., rotogravure), spraying, slot-die coating, drop-coating, dip-coating, etc. Regardless of the manner in which it is applied, the resulting electrode may be dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the supercapacitor. After any optional compression, the thickness of each carbonaceous coating may generally vary based on the desired electrical performance and operating range of the supercapacitor. Typically, however, the thickness of a coating may be from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) may be within a range of from about 20 to about 350 micrometers, in some embodiments from about 30 to about 300 micrometers, and in some embodiments from about 50 to about 250 micrometers.

Separator

A separator may also be positioned between the first and second electrodes. If desired, other separators may also be employed in the electrode assembly. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the supercapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

Figure 1A:
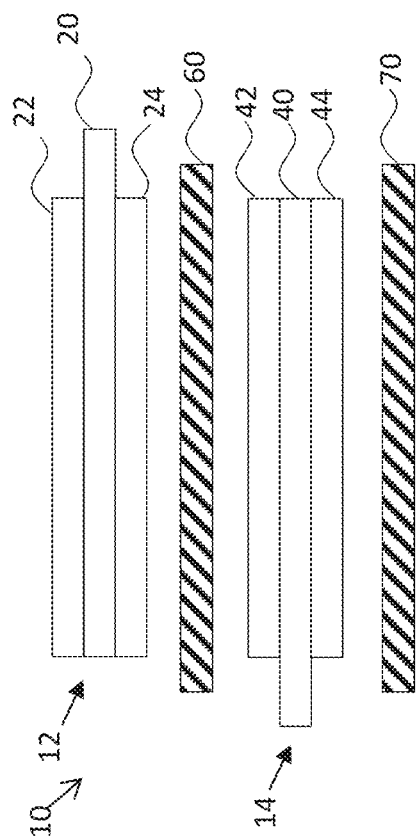
FIG. 1A illustrates a cross-sectional, exploded view of one embodiment of an electrode assembly in accordance with aspects of the present disclosure.

The manner in which the components of the electrode assembly are combined together may vary as is known in the art. For example, the electrodes and separator may be initially folded, wound, or otherwise contacted together to form an electrode assembly. In one particular embodiment, the electrodes, separator, and optional electrolyte may be wound into an electrode assembly having a "jelly-roll" configuration. Referring to FIG. 1A, for instance, one embodiment of an electrode assembly 10 is shown that contains a first electrode 12, second electrode 14, and a separator 60 positioned between the electrodes 12 and 14. In this particular embodiment, the electrode assembly 10 also includes another separator 70 that may be positioned over the second electrode 14. In this manner, each of two coated surfaces of the electrodes may be separated by a separator, thereby maximizing surface area per unit volume and capacitance. The first electrode 12 may contain carbonaceous coatings 22 and 24 disposed on opposing surfaces of a first current collector 20, while the second electrode 14 may contain carbonaceous coatings 42 and 44 disposed on opposing surfaces of a second current collector 40. Of course, it should be understood that both surfaces of a current collector need not contain a carbonaceous coating.

Figure 1B:
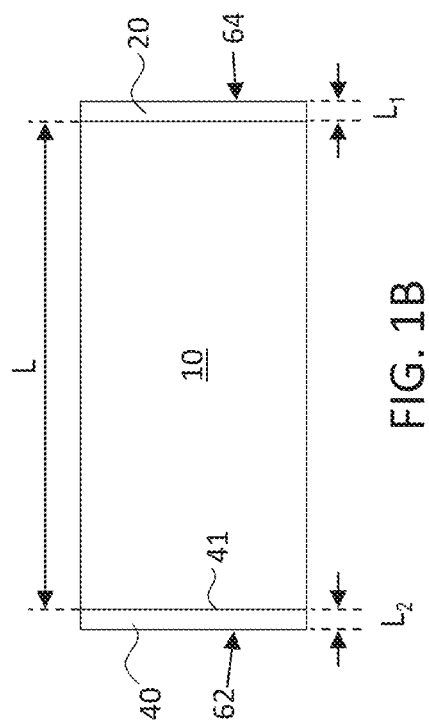
FIG. 1B illustrates a top view of the electrode assembly of FIG. 1A.

Referring to FIG. 1B, the electrodes 12 and 14 and separators 60 and 70 are wound together so that the assembly 10 extends in a longitudinal direction between longitudinal edges 41 and 21 to define a length "L." In the illustrated embodiment, for instance, the separators 60 and 70 are shown as having lengths that are similar in value and larger than the corresponding length of the carbonaceous coatings. Therefore, the length "L" of the assembly 10 in this embodiment may effectively be the distance between the outermost edges of the separators. For example the length "L" may be from about 5 to about 100 millimeters, in some embodiments from about 8 to about 60 millimeters, and in some embodiments, from about 10 to about 25 millimeters. The first current collector 20 may be positioned such that it has a first projecting portion 64 that projects beyond the longitudinal edge 21 of the assembly 10. Similarly, the second current collector 40 may be positioned such that it has a second projecting portion 62 that projects beyond the longitudinal edge 41 of the assembly 10. For example, the length "$L_1$" of the first projecting portion 64, the length "$L_2$" of the second projecting portion 62, or both may be from about 1 to about 20 millimeters, in some embodiments from about 2 to about 16 millimeters, and in some embodiments, from about 5 to about 15 millimeters. In the illustrated embodiment, the projection of the current collectors may be accomplished by using current collectors that have a length greater than the corresponding carbonaceous coatings. Alternatively, however, the projection of the current collectors could also be achieved by simply offsetting them relative to other components of the assembly.

Electrolyte

To form a supercapacitor, an electrolyte may be placed into ionic contact with the first electrode and the second electrode before, during, and/or after the electrodes and separator are combined together to form the electrode assembly. The electrolyte may generally be nonaqueous in nature and thus contains at least one nonaqueous solvent. To help extend the operating temperature range of the supercapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which may be dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid may generally be a salt having a relatively low melting temperature, such as about 400° C. or less, in some embodiments about 350° C. or less, in some embodiments from about 1° C. to about 100° C., and in some embodiments, from about 5° C. to about 50° C. The salt may contain a cationic species and counterion. The cationic species may contain a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium Spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

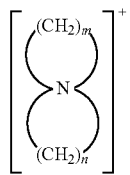

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

Housing

As noted above, the supercapacitor may also contain a housing within which the electrode assembly and electrolyte are retained and optionally hermetically sealed. The nature of the housing may vary as desired. In one embodiment, for example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable. In other embodiments, the housing may include any suitable plastic material (e.g., polypropylene (PP), high-density polyethylene (HDPE), low-density polyethylene (LDPE), etc.). The container may have any of a variety of different shapes, such as cylindrical, D-shaped, etc. Cylindrically-shaped containers are particular suitable.

The electrode assembly may be sealed within the cylindrical housing using a variety of different techniques. Referring to FIG. 1C, one embodiment of a supercapacitor 100 is shown that contains an electrode assembly 10, which may contain layers 106 wound together in a jelly-roll configuration. In some embodiments, the electrode assembly 10 may include current collectors that define a projection portion as described above with reference to FIGS. 1A and 1B. In this particular embodiment, the supercapacitor 100 may contain a first collector disc 114, which may contain a disc-shaped portion 134, a stud portion 136, and a fastener 138 (e.g., screw). The collector disc 114 may be aligned with a first end of a hollow core 160, which may be formed in the center of the electrode assembly, and the stud portion 136 may then be inserted into an opening of the core so that the disc-shaped portion 134 sits against the first end of the electrode assembly 108 at a first contact edge 110. A lid 118 may be welded (e.g., laser welded) to a first terminal post 116, and a socket, which may be for example, threaded, may be coupled to the fastener 138. The supercapacitor 100 may also contain a second collector disc 120, which may contain a disc-shaped portion 142, a stud portion 140, and a second terminal post 144. The second collector disc 120 may be aligned with the second end of the hollow core 160, and the stud portion 140 may then be inserted into the opening of the core so that the collector disc portion 142 sits against the second end of the electrode assembly 108.

A container 122 (e.g., cylindrically-shaped can) may thereafter be slid over the electrode assembly 108 so that the second collector disc 120 enters the container 122 first, passes through a first insulating washer 124, passes through an axial hole at an end of the container 122, and then passes through a second insulating washer 126. The second collector disc 120 also passes through a flat washer 128 and a spring washer 130. A locknut 132 may be tightened over the spring washer 130, which compresses the spring washer 130 against the flat washer 128, which in turn may be compressed against the second insulating washer 126. The second insulating washer 126 may be compressed against the exterior periphery of the axial hole in the metal container 122, and as the second collector disc 120 may be drawn by this compressive force toward the axial hole, the first insulating washer 124 may be compressed between the second collector disc 120 and an interior periphery of the axial hole in the container 122. A flange on the first insulating washer 124 inhibits electrical contact between the second collector disc 120 and a rim of the axial hole. Simultaneously, the lid 118 may be drawn into an opening of the container 122 so that a rim of the lid 118 sits just inside a lip of the opening of the container 122. The rim of the lid 118 may then be welded to the lip of the opening of the container 122.

Once the locknut 132 is tightened against the spring washer 130, a hermetic seal may be formed between the axial hole, the first insulating washer 124, the second insulating washer 126, and the second collector disc 120. Similarly, the welding of the lid 118 to the lip of the container 122, and the welding of the lid 118 to the first terminal post 116, may form another hermetic seal. A hole 146 in the lid 118 can remain open to serve as a fill port for the electrolyte described above. Once the electrolyte is in the can (i.e., drawn into the can under vacuum, as described above), a bushing 148 may be inserted into the hole 146 and seated against a flange 150 at an interior edge of the hole 146. The bushing 148 may, for instance, be a hollow cylinder in shape, fashioned to receive a plug 152. The plug 152, which is cylindrical in shape, may be pressed into a center of the bushing 148, thereby compressing the bushing 148 against an interior of the hole 146 and forming a hermetic seal between the hole 146, the bushing 148, and the plug 152. The plug 152 and the bushing 148 may be selected to dislodge when a prescribed level of pressure is reached within the supercapacitor, thereby forming an overpressure safety mechanism.

The embodiments described above generally refer to the use of a single electrochemical cell in the capacitor. It should of course be understood, however, that the capacitor of the present invention may also contain two or more electrochemical cells. In one such embodiment, for example, the capacitor may include a stack of two or more electrochemical cells, which may be the same or different.

The housing of the supercapacitor may be any suitable size and shape. For example, in some embodiments, the housing may have a length ranging from about 10 mm to about 250 mm, in some embodiments from about 20 mm to about 120 mm. In some embodiments, the housing may have a generally cylindrical shape, and a diameter ranging from about 3 mm to about 70 mm, and in some embodiments from about 8 mm to about 40 mm.

Module

Referring to FIGS. 2A and 2B, a supercapacitor module 200 may be formed that includes two or more supercapacitors. For example, the module 200 may include a first supercapacitor 202 and a second supercapacitor 204. The supercapacitors 202, 204 may each include an electrode assembly and a nonaqueous ionic liquid-based electrolyte contained with a housing. Each electrode assembly may include a first electrode that contains a first carbonaceous coating (e.g., activated carbon particles) electrically coupled to a first current collector, and a second electrode that contains a second carbonaceous coating (e.g., activated carbon particles) electrically coupled to a second current collector, for example, as discussed above. The electrode assemblies may generally have a jelly-roll configuration.

The first supercapacitor 202 may include a positive terminal 208 and a negative terminal 210. Similarly the second supercapacitor 204 may include a positive terminal 212 and a negative terminal 214. The supercapacitors 202, 204 may generally be matched to each other such that the supercapacitors 202, 204 have similar voltages, equivalent series resistance, etc.

Interconnect

An interconnect 206 may electrically connect the supercapacitors 202, 204 in series. For example, the interconnect 206 may connect the positive terminal 208 of the first supercapacitor 202 with the negative terminal 210 of the second supercapacitor 204. The interconnect 206 may include a negative electrical lead 216 connected with the negative terminal 210 of the first supercapacitor 202. Similarly, the interconnect 206 may include a positive electrical lead 218 electrically connected with the positive terminal 212 of the second supercapacitor 204. Additionally, although illustrated as connected with the inner terminals of the supper capacitors 202, 204, in other embodiments, the electrical leads 216, 218 may be instead be connected to the outer terminals of the supercapacitors 202, 204, and the interconnect 206 may electrically connect the inner terminals of the supercapacitors 202, 204 to each other. The interconnect 206 may be formed from a variety of materials. For example, the interconnect 206 may comprise any suitable plastic, resin, metal etc.

Balancing Circuit

According to aspects of the present disclosure, in some embodiments, the interconnect may include a balancing circuit configured to provide balancing for the first and second supercapacitors.

Figure 3:
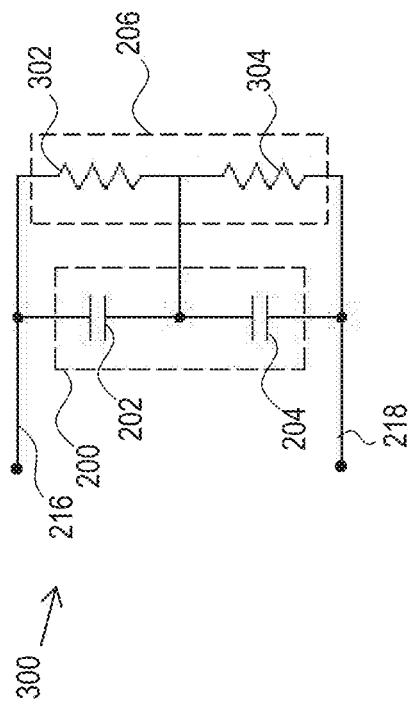
FIG. 3 illustrates a passive balancing circuit that may be included in an interconnect of the supercapacitor module in accordance with aspects of the present disclosure.

For example, referring to FIG. 3, in some embodiments, the interconnect 206 may include a passive balancing circuit that includes one or more resistors. For example, a passive balancing circuit 300 may include a first resistor 302 connected in parallel with the first supercapacitor 202 and a second resistor 304 connected in parallel with the second supercapacitor 304. The first and second resistors may have approximately the same resistance. Such a configuration may prevent one of the supercapacitors from operating at a higher voltage than the other supercapacitor.

In other embodiments, the interconnect 206 may include an active balancing circuit. For example, an active balancing circuit for a supercapacitor module can include a regulator. The regulator can be configured to receive an input voltage associated with a voltage across the each supercapacitor and compare the input voltage with a reference voltage (e.g., a balance voltage for the supercapacitor). The regulator can be any device that is operable to compare the input voltage with the reference voltage and provide an output. In some embodiments, the regulator can include a comparator and/or one or more switching elements provided in a single package (e.g., integrated circuit).

The input voltage can be any signal or voltage indicative of the voltage across the supercapacitor. In some embodiments, the input voltage can be provided using a voltage divider circuit. The input voltage can be received at a sensing input of the regulator (e.g., via the voltage divider circuit).

The regulator can be configured to provide an output via an output node of the regulator based at least in part on the input voltage relative to the reference voltage. For instance, the regulator can be configured to provide a first output (e.g., a first logic output) via the output node when the input voltage is greater than the reference voltage. The regulator can be configured to provide a second output (e.g., a second logic output) via the output node when the voltage is associated with the supercapacitor is not greater than the reference voltage.

The output of the regulator can be used to drive a switching circuit. The switching circuit can include one or more semiconductor switching elements, such as field effect transistors (e.g., MOSFETs). The switching elements can be operated in a fully saturated mode such that the switching elements are switched on and off in a hard switching manner. Hard switching can occur, for instance, when a semiconductor switching element is operated in a state such that the current through the switching element does not substantially increase or decrease despite a change in supply voltage. For example, hard switching can occur for a field effect transistor when the field effect transistor is operated in a saturation region such that a drain current does not increase despite an increase in the drain source voltage of the field effect transistor. This can allow the switching elements to accommodate higher currents associated with discharging supercapacitor.

When the output of the regulator is a first output (e.g., the input voltage is greater than a reference voltage) the one or more switching elements in the switching circuit can be switched on (e.g., in a hard switching manner) so that current flows from the supercapacitor through at least one of switching elements in the switching circuit to discharge the supercapacitor, causing the voltage across the supercapacitor to decrease. When the output of the regulator is a second output (e.g., the input voltage is less than a reference voltage) the one or more switching elements in the switching circuit can be switched off (e.g., in a hard switching manner) so that the supercapacitor is charged causing the voltage associated with the supercapacitor to increase. In this way, the balancing circuit can operate according to a switching mode regime where the supercapacitor is charged until the voltage associated with the supercapacitor exceeds a threshold and discharged until the voltage associated with the supercapacitor falls below the threshold.

Figure 4:
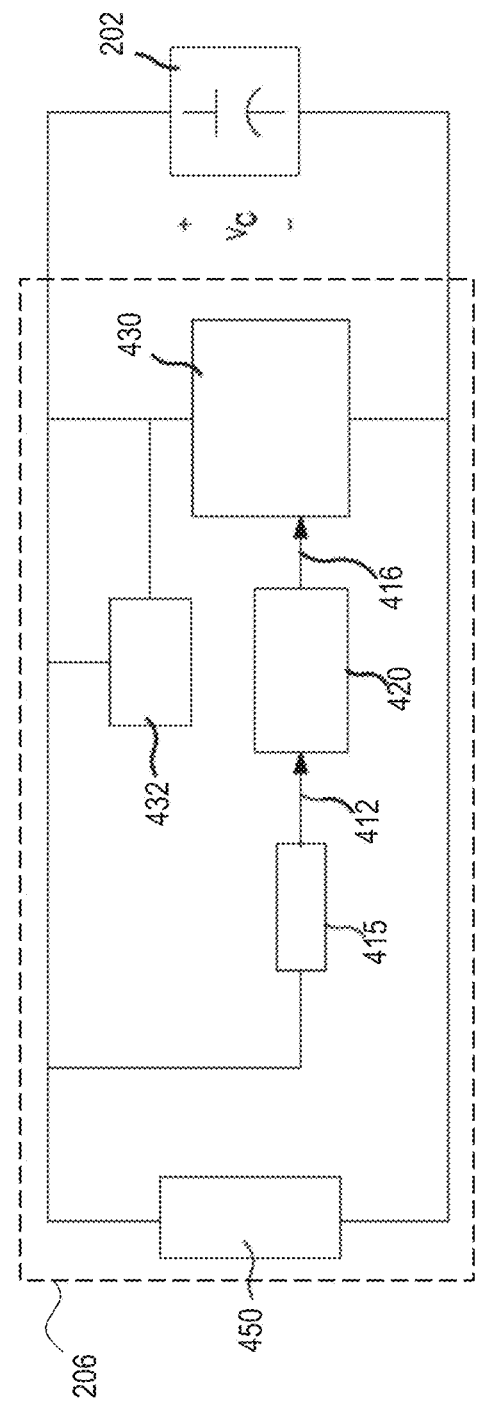
FIG. 4 illustrates an active balancing circuit that may be included in an interconnect of the supercapacitor module in accordance with aspects of the present disclosure.

FIG. 4 depicts a block diagram of an example active balancing circuit 400 for use with a supercapacitor module according to example embodiments of the present disclosure. For example, a first active balancing circuit may be configured to regulate a first voltage across the first supercapacitor and a second active balancing circuit may be configured to regulate a second voltage across the second supercapacitor. For simplicity, FIG. 4 merely illustrates the first active balancing circuit 400 and first supercapacitor 202.

The active balancing circuit 400 includes a regulator 420. The regulator 420 can receive a signal 412 (e.g., input voltage) indicative of a voltage Vc across the capacitor via an input circuit, such as a voltage divider 415. The regulator 420 can compare the signal 412 with a reference voltage. In some embodiments, the reference voltage can be determined based on a desired voltage at which the supercapacitor is to be maintained.

The regulator 420 can provide an output 416 based on the signal 412 indicative of the voltage Vc and the reference voltage. For instance, the regulator 420 can provide a first logic output (e.g., logic high) when the signal 412 indicative of the voltage Vc across the supercapacitor is greater than the reference voltage. The regulator 420 can provide a second logic output (e.g., logic low) when the signal 412 indicative of the voltage Vc across the supercapacitor is not greater than the reference voltage.

The output 416 can be provided to a switching circuit 430. The switching circuit 430 can include one or more semiconductor switching elements (e.g., field effect transistors). When the one or more switching elements are in a conducting state, the supercapacitor can discharge, reducing the voltage across the supercapacitor. The supercapacitor can discharge until the signal 412 indicative of the voltage Vc across the supercapacitor is reduced low enough so that the signal 412 is no longer greater than the reference voltage. At this point, the switching elements can be controlled to be in a non-conducting state to charge the supercapacitor. In this way, the balancing circuit 400 can be used to regulate the voltage of the supercapacitor and reduce overvoltage conditions using a switching mode regime. In a switching mode regime, the switching circuit may be controlled to switch the supercapacitor back and forth between a discharging state and a not discharging state to maintain the voltage of the supercapacitor within a range or at a balance voltage.

In some embodiments, the semiconductor switching elements of the switching circuit 430 can be operated in a fully saturated mode to provide for hard switching of the switching elements. This can allow for the switching elements to accommodate the high currents from the supercapacitor during that can result from discharging the supercapacitor according to the switching mode regime.

A DC to DC converter 432 can be used to boost a DC voltage applied to the switching elements in the switching circuit to provide for improved performance of the semiconductor switching element when operating in, for instance, a fully saturated mode for hard switching of the semiconductor switching elements. The DC to DC converter can be coupled between the supercapacitor 202 and the switching circuit 430.

In some embodiments, the active balancing circuit 400 can include a notification circuit 450. The notification circuit 450 can include a comparator. The comparator can compare the voltage associated with the supercapacitor 202 with a threshold. If the voltage associated with the supercapacitor 202 exceeds the threshold, the notification circuit 450 can provide a signal indicating that the voltage associated with the supercapacitor 202 exceeds the threshold. This can be used to provide a notification (e.g., a visual indicator via a light emitting diode or other suitable notification.

Casing

In some embodiments, a casing (e.g., an encapsulant layer) may be formed around the supercapacitors 202, 204. As discussed above, the casing may be formed from a variety of suitable materials, including a thermoset resin (optionally including curing agents and/or other additives). Any suitable material may be used that protects the supercapacitor(s) 202, 204 and/or interconnect 206 from moisture (e.g., humidity) and/or damage from impact, abrasion, etc.

Referring to FIGS. 5A and 5B, in some embodiments, the supercapacitors 202, 204 may be encapsulated in the casing 502. The interconnect 206 may be located outside the casing 502. Such a configuration may provide humidity protection while also providing access to the terminals of the supercapacitor module, for example. Referring to FIGS. 6A and 6B, in other embodiments, the supercapacitors 202, 204 and the interconnect 206 may both be encapsulated within the casing 502. Such a configuration may additionally protect the interconnect 206 from humidity, which may cause corrosion.

Applications

The various embodiments of the electrical circuit described herein may find application in any suitable type of electrical component. Example applications include power meters, uninterruptible power supplies (UPS), and computer applications, such as power backup for random access memory (RAM). The electrical circuit described herein may find particular application in a meter for measuring a flow of a product, (e.g., electricity, water, gas, etc.).

For example, power meters may be configured to measure power usage (e.g., of residential and/or commercial buildings). Some power meters (e.g., "smart" power meters) may be capable of wirelessly communicating data about the measured power consumption for improved monitoring and/or management of the power grid. For example, smart power meters may communicate power usage to a utility station and/or personal computing device. This may allow residents to monitor the power usage of their house or apartment, which may result in more efficient power use and management.

According to aspects of the present disclosure, power meters may employ a supercapacitor and/or electrical circuit as described herein. The supercapacitor(s) may provide several benefits in the power meter circuit. For example, supercapacitor(s) may supply back-up power in the event of power outages and/or power glitches. This may improve the reliability of the power meter. For example, such power meters may be able to continue transmitting information about power usage despite power glitches or abnormalities that may otherwise prevent the power meter from properly functioning.

Supercapacitors may also extend the life of batteries and/or power supply circuitry in a power meter. For example, supercapacitor(s) may help meet irregular or excessive power demands by the power meter, which may help protect the batteries and/or power supply circuitry.

Power Meters

Figure 7B:
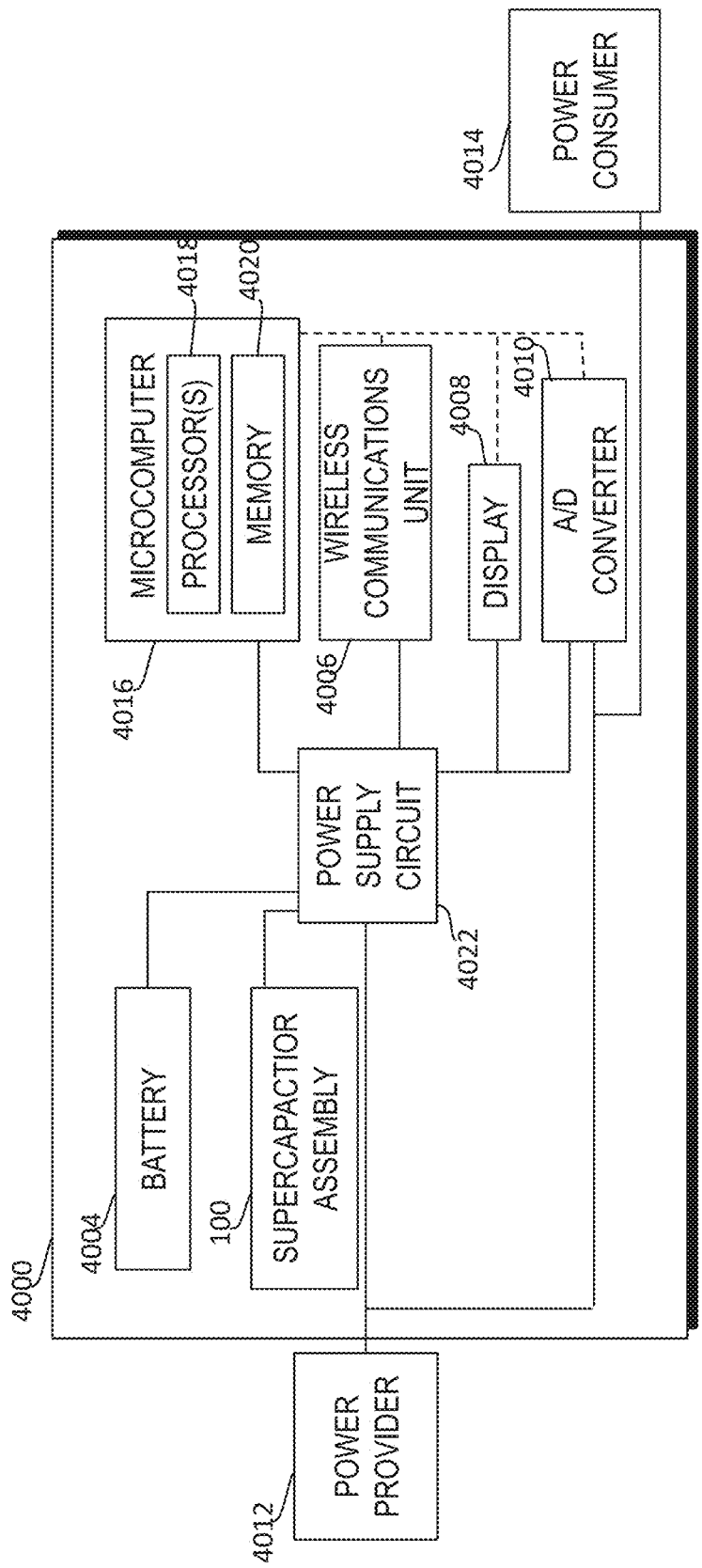
FIG. 7B illustrates a schematic view of an embodiment of a meter for measuring power usage that includes a supercapacitor module in accordance with aspects of the present disclosure.

Referring to FIGS. 7A and 7B, in some embodiments, a meter may be configured as a power meter 4000 and include at least one the supercapacitor module 200 mounted to a substrate 202, such as a PCB. In some embodiments, the power meter 4000 may also include a battery 4004 that is electrically connected with the supercapacitor module(s) 200. The supercapacitor module(s) 200 may be configured to provide a backup power supply in the event of excessive power demand or battery failure, as discussed above.

The power meter 4000 may be configured as a "smart" power meter and include a wireless communication unit 4006 that is configured to transmit and/or receive data via any suitable network, such as a local wireless network using any suitable wireless communications protocol (e.g., WiFi, Bluetooth, and/or the like) and/or a broader network, such as a wide-area network (WAN), using any suitable communications protocol (e.g., TCP/IP, HTTP, SMTP, FTP). The power meter 4000 may be configured to transmit power usage to a utility provider and/or a user computing device for monitoring.

The power meter 4000 may also include a display 4008 and/or user input device. For example, the display 4008 may be configured as a touchscreen such that a user may input information (e.g., settings, alerts, etc.) using the touchscreen.

The power meter 4000 may include a sensor 4010 configured to measure a power usage rate. For example, in some embodiments, the sensor 4010 may include an A/D converter configured to detect an analog signal (e.g., voltage or current) indicative of a measurement of the power flowing through the power meter 4000. For example, referring to FIG. 7B, the A/D converter 4010 may be electrically connected with each of a power provider 4012 (e.g., a power grid supplied by a power station) and a power consumer 4014 (e.g., a residential and/or commercial building). The A/D converter 4010 may convert the analog signal into a digital signal indicative of the power usage rate.

The power meter 4000 may also include a microcomputer 4016. In general, the microcomputer 4016 may correspond to any suitable processor-based device(s), such as a computing device or any combination of computing devices. Thus, in several embodiments, the microcomputer 4016 may include one or more processor(s) 4018 and associated memory device(s) 4020 configured to perform a variety of computer-implemented functions. As used herein, the term "processor" refers not only to integrated circuits referred to in the art as being included in a computer, but also refers to a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) configure the controller to perform various computer-implemented functions.

The microcomputer 4016 may be communicatively coupled with the wireless communications unit 4006, display 4008, and/or A/D converter 4010. The microcomputer 4016 may be configured to receive signals from the sensor 4010 indicative of the power usage rate and calculate the power usage rate based on the received signals. The microcomputer 4016 may also be configured to transmit the power usage rate via the wireless communications unit 4006 and/or control the operation of the display 4008 such that the power usage rate may appear on the display 4008.

The smart meter 4000 may also include a power supply circuit 4022. The power supply circuit 4022 may be electrically connected with the supercapacitor(s) 212, the battery 4004, and/or the power provider 4012. For example, the power supply circuit 4005 may be configured to regulate power supplied from the supercapacitor module (s) 200, the battery 4004, and/or the power provider 4012 to the microcomputer 4012, wireless communication unit 4006, display 4008, and/or A/D converter 4010. For example, if the power supplied by the power provider 4012 becomes intermittent and/or irregular, the power supply circuit 4022 may draw power from the battery and/or supercapacitor 212 to meet the demands of the other components included in the smart meter 4000.

The smart power meter 4000 may be configured to as an "Internet of Things" ("IoT") device. The microcomputer 4016 may be configured to perform other various functions. For example, the microcomputer 4016 may be configured to detect when the power usage rate exceeds a predetermined threshold and transmit an alert (via the wireless communications unit 4006). In some embodiments, the microcomputer 4016 may also be configured to wireless communicate (via the wireless communications unit 4006) with individual power-consuming devices, such as smart appliances, for example. The microcomputer 4016 may be configured to monitor the power used by such appliances with respect to the total power usage rate detected by the A/D converter 4010. For example, the microcomputer 4016 may be configured to compile a summary showing the total power used in a given time period (e.g., one month) and the portions thereof used by individual power-consuming devices (e.g., smart appliances). The microcomputer 4016 may be configured to transmit the summary via the wireless communications unit 4006 to the resident of the house, for example.

Water and Gas Meters

In other embodiments, the meter may be configured as a water or gas meter. In such embodiments, the sensor 4010 may be a flow transducer and be configured to generate signals indicative of the flow rate of water or gas from a source to a consumer unit (e.g., a residential or commercial building). In such embodiments, battery 4004 and/or supercapacitor assembly 100 may be the sole supply of power for the meter. Thus, the power supply circuit 4022 may be configured to regulate the power supplied from the battery 4004 and supercapacitor assembly 100 to the other components of the meter. In the event of battery failure, the supercapacitor assembly 100 may provide power for an additional time period such that the meter may send a signal via the wireless communications unit 4006 indicating that the battery 4004 has failed and that servicing is needed.

Test Methods

Equivalent Series Resistance (ESR)

Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 100 kHz. A variety of temperature and relative humidity levels may be tested. For example, the temperature may be 25° C., 85° C., or 105° C., and the relative humidity may be 25% or 85%.

Capacitance

The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 25° C., 85° C., or 105° C., and the relative humidity may be 25% or 85%.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A supercapacitor module comprising:
   a first supercapacitor including an electrode assembly having a jellyroll configuration, an electrolyte, and a first housing containing the electrode assembly and the electrolyte, the first supercapacitor having a positive terminal and a negative terminal;
   a second supercapacitor including an electrode assembly having a jellyroll configuration, an electrolyte, and a second housing containing the electrode assembly and the electrolyte, the second supercapacitor having a positive terminal and a negative terminal;
   an interconnect electrically connecting the positive terminal of the first supercapacitor and the negative terminal of second supercapacitor in series; and
   a casing encapsulating at least the first and second supercapacitors wherein the casing comprises a thermoplastic resin or a thermoset resin and wherein the interconnect is located outside of the casing;
   wherein:
      the operating voltage of the supercapacitor module is greater than 3.5 volts; and
      the equivalent series resistance of the supercapacitor module is from 150 milliohm to less than about 10 ohm.

2. The supercapacitor module of claim 1, wherein the casing comprises an epoxy resin.

3. The supercapacitor module of claim 1, wherein the casing comprises a curing agent.

4. The supercapacitor module of claim 3, wherein the curing agent comprises at least one of an amine, peroxide, anhydride, phenol compound, silane, or acid anhydride compound.

5. The supercapacitor module of claim 1, wherein the interconnect comprises a passive balancing circuit.

6. The supercapacitor module of claim 1, wherein the interconnect comprises an active balancing circuit.

7. The supercapacitor module of claim 1, wherein at least one of the first supercapacitor or second supercapacitor comprises:
   a first electrode comprising a first current collector electrically coupled to a first carbonaceous coating;
   a second electrode comprising a second current collector electrically coupled to a second carbonaceous coating; and
   a separator positioned between the first electrode and the second electrode.

8. The supercapacitor module of claim 1, wherein the capacitance of the first supercapacitor and/or the second supercapacitor of the supercapacitor module is from 100 F to 1,000 F.

9. A device for measuring a flow of a product, the device comprising:
   a meter comprising:
   a supercapacitor module comprising
      a first supercapacitor including an electrode assembly having a jellyroll configuration, an electrolyte, and a first housing containing the electrode assembly and the electrolyte, the first supercapacitor having a positive terminal and a negative terminal,
      a second supercapacitor including an electrode assembly having a jellyroll configuration, an electrolyte, and a second housing containing the electrode assembly and the electrolyte, the second supercapacitor having a positive terminal and a negative terminal, and
      an interconnect electrically connecting the positive terminal of the first supercapacitor and the negative terminal of second supercapacitor in series,
      wherein the operating voltage of the supercapacitor module is greater than 3.5 volts, and wherein the equivalent series resistance of the supercapacitor module is less than about 10 ohm; and
   a casing encapsulating at least the first and second supercapacitors wherein the interconnect is located outside of the casing.

10. The meter of claim 9, wherein the meter is configured to measure a flow of at least one of electricity, gas, or water.

11. The meter of claim 9, wherein the casing comprises an epoxy resin.

12. The meter of claim 9, wherein the casing comprises a curing agent.

13. The meter of claim 12, wherein the curing agent comprises at least one of an amine, peroxide, anhydride, phenol compound, silane, or acid anhydride compound.

14. The meter of claim 9, wherein the interconnect comprises a passive balancing circuit.

15. The meter of claim 9, wherein the interconnect comprises an active balancing circuit.

16. A supercapacitor module comprising:
a first supercapacitor including an electrode assembly having a jellyroll configuration, an electrolyte, and a first housing containing the electrode assembly and the electrolyte, the first supercapacitor having a positive terminal and a negative terminal;
a second supercapacitor including an electrode assembly having a jellyroll configuration, an electrolyte, and a second housing containing the electrode assembly and the electrolyte, the second supercapacitor having a positive terminal and a negative terminal;
an interconnect electrically connecting the positive terminal of the first supercapacitor and the negative terminal of second supercapacitor in series, the interconnect comprising a balancing circuit; and
a casing encapsulating at least the first and second supercapacitors wherein the casing comprises a thermoplastic resin or a thermoset resin and wherein the interconnect is located outside of the casing.

17. The supercapacitor module of claim 16, wherein the balancing circuit is active.

18. The supercapacitor module of claim 16, wherein:
the operating voltage of the supercapacitor module is greater than 3.5 volts; and
the equivalent series resistance of the supercapacitor module is less than about 10 ohm.

19. A supercapacitor module comprising:
a first supercapacitor including a positive terminal and a negative terminal and including an electrode assembly having a jellyroll configuration, an electrolyte, and a first housing containing the electrode assembly and the electrolyte;
a second supercapacitor including a positive terminal and a negative terminal and including an electrode assembly having a jellyroll configuration, an electrolyte, and a second housing containing the electrode assembly and the electrolyte;
a negative electrical lead connected to the negative terminal of the first supercapacitor;
a positive electrical lead connected to the positive terminal of the second supercapacitor;
an interconnect electrically connecting the positive terminal of the first supercapacitor and the negative terminal of second supercapacitor in series through the negative electrical lead and the positive electrical lead; and
a casing encapsulating at least the first and second supercapacitors wherein the casing comprises a thermoplastic resin or a thermoset resin wherein the interconnect is located outside of the casing.

* * * * *